(12) United States Patent
Dyer, Jr.

(10) Patent No.: US 9,675,048 B2
(45) Date of Patent: Jun. 13, 2017

(54) FLY CATCHING ANIMAL MASK DEVICE

(71) Applicant: Maria Jesus Dyer

(72) Inventor: Estill B. Dyer, Jr., South El Monte, CA (US)

( * ) Notice: Subject to any disclaimer, the term of this patent is extended or adjusted under 35 U.S.C. 154(b) by 99 days.

(21) Appl. No.: 14/310,500

(22) Filed: Jun. 20, 2014

(65) Prior Publication Data
US 2015/0366164 A1 Dec. 24, 2015

(51) Int. Cl.
*A01K 13/00* (2006.01)
*A01M 1/14* (2006.01)
*A01M 1/20* (2006.01)

(52) U.S. Cl.
CPC ............ *A01K 13/006* (2013.01); *A01M 1/14* (2013.01); *A01M 1/20* (2013.01)

(58) Field of Classification Search
CPC .......................... A01K 13/006; A01K 27/007
USPC ...... 54/80.1, 80.2, 80.4, 80.5; 119/850, 858, 119/860
See application file for complete search history.

(56) References Cited

U.S. PATENT DOCUMENTS

| | | | |
|---|---|---|---|
| 584,506 A | 6/1897 | Harriss | |
| 1,516,202 A | 11/1924 | Nelson | |
| 1,560,683 A * | 11/1925 | Foley | A01K 13/006 119/654 |
| 3,104,508 A | 9/1963 | O'Hare, Jr. | |
| 3,778,966 A | 12/1973 | Hadley | |
| 3,811,413 A * | 5/1974 | Scherpenborg | A01K 27/007 119/654 |
| D245,115 S | 7/1977 | Centers et al. | |
| 4,184,452 A * | 1/1980 | Buzzell | A01K 27/007 119/654 |
| 4,350,122 A * | 9/1982 | Shotwell | A01K 27/007 119/654 |
| 5,341,627 A * | 8/1994 | Eby | A01K 13/006 119/654 |
| 5,440,864 A | 8/1995 | Green | |
| 6,128,891 A | 10/2000 | McMahon | |
| 6,998,133 B2 | 2/2006 | Simpson | |
| 2002/0124457 A1* | 9/2002 | Cosenza | A01M 1/14 43/114 |
| 2007/0068066 A1 | 3/2007 | Reatti | |
| 2007/0169444 A1 | 7/2007 | Hung | |
| 2011/0253064 A1* | 10/2011 | Cates | A01K 13/006 119/850 |
| 2012/0036816 A1* | 2/2012 | Gilligan | A01K 13/006 54/80.2 |
| 2012/0315317 A1* | 12/2012 | O'Hara | A01N 25/08 424/414 |
| 2015/0113923 A1* | 4/2015 | Wood | A01K 13/006 54/80.2 |

* cited by examiner

Primary Examiner — Lisa Tsang

(57) ABSTRACT

A fly catching animal mask device prevents flies and other insects from bothering an animal's eyes. The device includes a mask having at least one eye hole configured to fit on a head of an animal such that the eye hole is positioned around an eye of the animal. A strip of material is coupled to the mask. The strip of material has an exposed outer face extending around the eye hole. An adhesive is coupled to and extends over the exposed outer face of the strip of material wherein the outer face is configured for catching and holding flies contacting the adhesive.

10 Claims, 3 Drawing Sheets

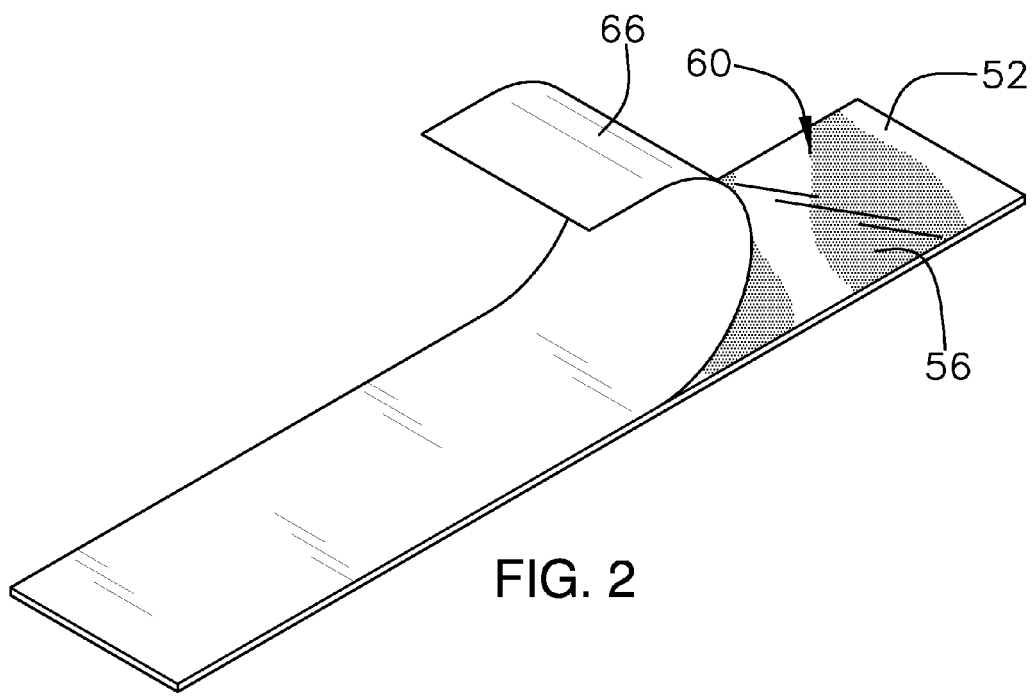
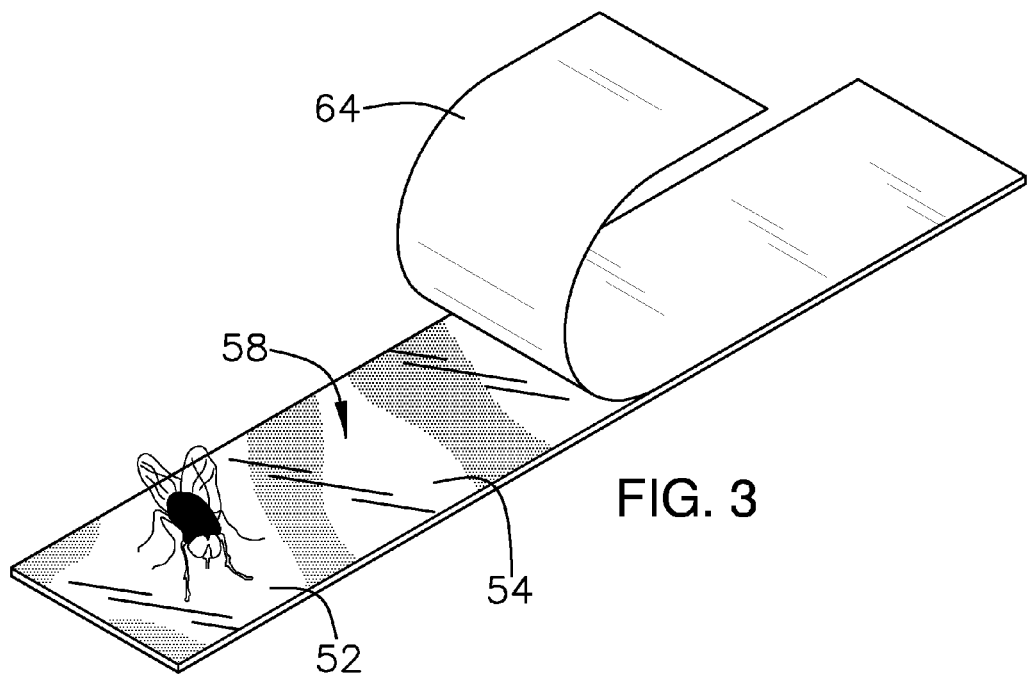

FLY CATCHING ANIMAL MASK DEVICE

BACKGROUND OF THE DISCLOSURE

Field of the Disclosure

The disclosure relates to mask devices and more particularly pertains to a new mask device for preventing flies and other insects from bothering an animal's eyes.

SUMMARY OF THE DISCLOSURE

An embodiment of the disclosure meets the needs presented above by generally comprising a mask having at least one eye hole configured to fit on a head of an animal such that the eye hole is positioned around an eye of the animal. A strip of material is coupled to the mask. The strip of material has an exposed outer face extending around the eye hole. An adhesive is coupled to and extends over the exposed outer face of the strip of material wherein the outer face is configured for catching and holding flies contacting the adhesive.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a bottom back side perspective view of an embodiment of the disclosure.

FIG. 3 is a top front side perspective view of an embodiment of the disclosure.

DESCRIPTION OF THE PREFERRED EMBODIMENT

Figure 1:
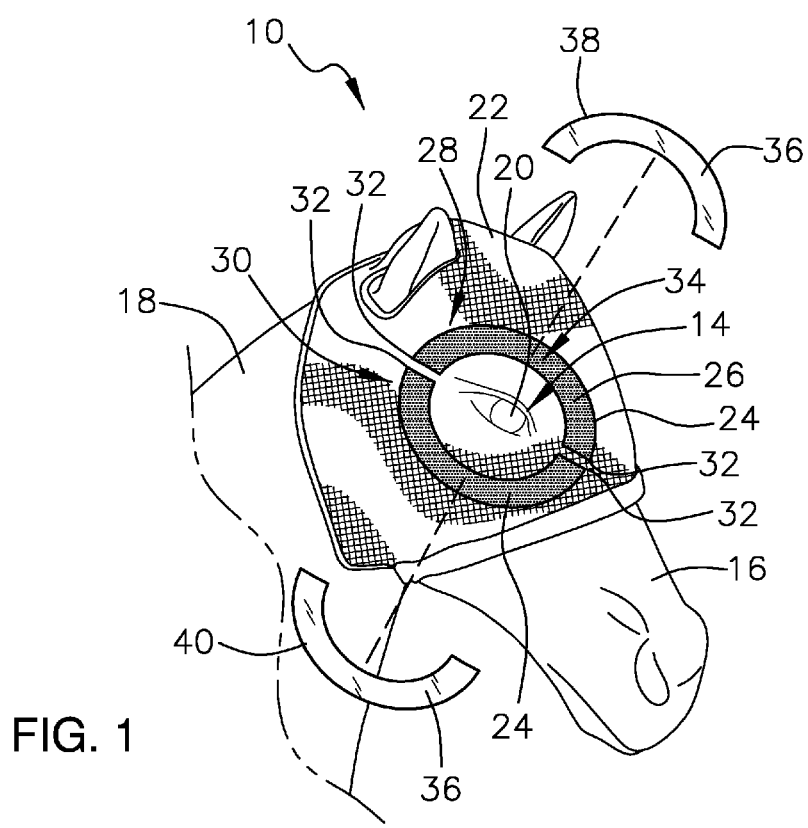
FIG. 1 is a top front side perspective view of a fly catching animal mask device according to an embodiment of the disclosure.
Figure 4:
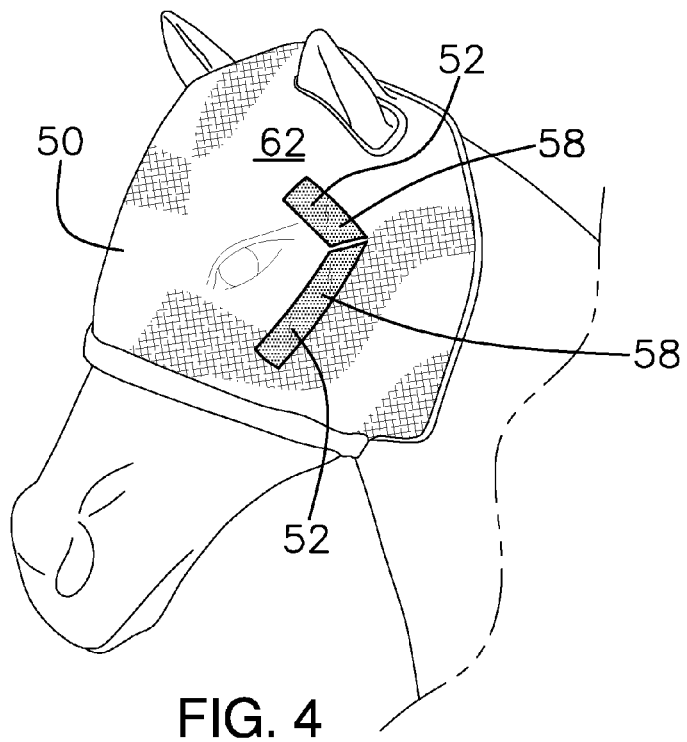
FIG. 4 is a top front side perspective view of an embodiment of the disclosure.
Figure 5:
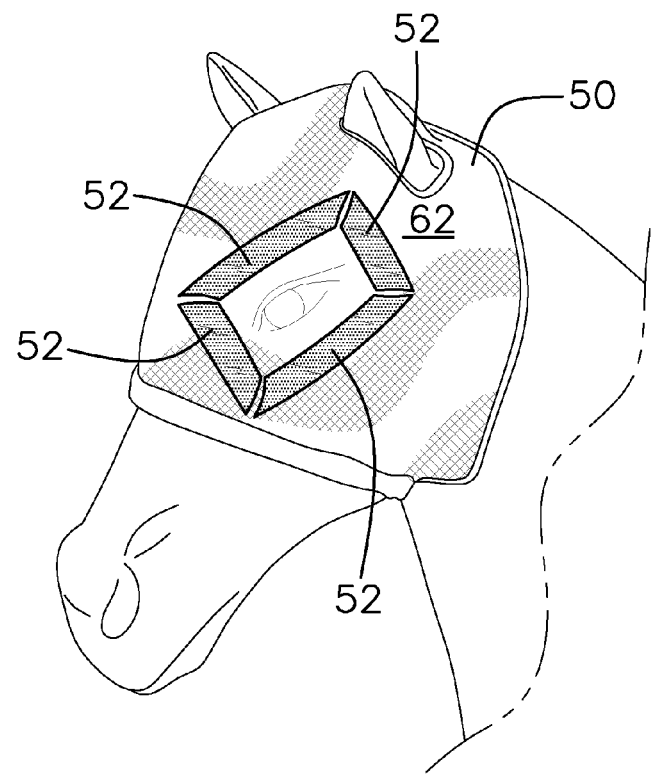
FIG. 5 is a top front side perspective view of an embodiment of the disclosure.

With reference now to the drawings, and in particular to FIGS. 1 through 5 thereof, a new mask device embodying the principles and concepts of an embodiment of the disclosure and generally designated by the reference numeral 10 will be described.

As best illustrated in FIGS. 1 through 5, the fly catching animal mask device 10 generally comprises a mask 12 having at least one eye hole 14 configured to fit on a head 16 of an animal 18 such that the eye hole 14 is positioned around an eye 20 of the animal 18. The mask 12 may comprise a horse mask 22 having conventional aspects of known horse masks incorporated into the structure herein described except where such incorporation would be impossible to achieve with the structure herein described.

A strip of material 24 is selectively coupled to the mask 12. The strip of material 24 has an exposed outer face 26 during use. The strip of material 24 is positioned to extend around the eye hole 14 of the mask 12. The strip of material 24 may have a first section 28 and a second section 30. Each of the first section 28 and the second section 30 may be arcuate. Each of the first section 28 and the second section 30 may have co-linear opposite ends 32 permitting the first section 28 and the second section 30 to be positioned to form a complete circular band around the eye hole 14 of the mask 12. The opposite ends 32 may also be slightly spaced to provide additional spacing between the first section 28 and the second section 30 if desired.

An adhesive 34 is coupled to and extends over the exposed outer face 26 of the strip of material 24 wherein the outer face 26 is configured for catching and holding flies contacting the adhesive 34. The adhesive 34 may comprise a fragrance wherein the adhesive 34 is configured to attract insects to the exposed outer face 26. The adhesive 34 may further comprise a sweetener wherein the adhesive 34 is further configured to attract insects. A cover 36 may be coupled to the outer face 26 of the strip of material 24 and removed when the mask 12 is to be worn by the animal 18. The cover 36 may comprise a first portion 38 complementary to and coupled to the first section 28 of the strip of adhesive 24 and a second portion 40 complimentary to and coupled to the second section 30 of the strip of material 24. The first portion 38 of the cover 36 and the second portion 40 of the cover 36 are each selectively removable to expose the adhesive 34 when desired. The adhesive 34 may incorporate an insecticide wherein the adhesive 34 is also configured for killing insects becoming affixed to the adhesive 34.

The device 10 may be provided in a customizable form attachable to an existing mask 50. In this embodiment exemplified in FIGS. 2 and 3, a strip of material 52 has a first face 54 and a second face 56. A first adhesive 58 is coupled to and covers the first face 54 of the strip of material 52. The first adhesive 58 may incorporate an attractant such as described above, i.e. a fragrance, a sweetener, or the like. Thus, the first adhesive 58 is configured for attracting insects and affixing the insects to the first face 54 of the strip of material 52 when the insect contacts the first adhesive 58. A second adhesive 60 is coupled to and covers the second face 56 of the strip of material 52 wherein the second face 56 of the strip of material 52 is configured for adhesively coupling to an exterior surface 62 of the existing animal mask 50.

A first protector 64 may be removably coupled to the first face 54 of the strip of material 52. The first protector 64 removably covers the first adhesive 58 and may be removed to expose the first adhesive 58 when desired. A second protector 66 is removably coupled to the second face 56 of the strip of material 52. The second protector 66 removably covers the second adhesive 60 until such time as the second adhesive 60 is exposed and the strip of material 52 is adhered to the existing mask 50 in a desired position.

In use, the respective strip of material 24,52 is positioned on the respective mask 12,50 and the associated adhesive 34,58 is exposed to attract and trap insects such that the insects are prevented from worrying the animal 18 wearing the mask 12,50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fly catching animal mask device comprising:
    a mask having at least one eye hole configured to fit on a head of an animal such that said eye hole is positioned around an eye of the animal;
    a strip of material coupled to said mask, said strip of material having an exposed outer face, said strip of material extending around said eye hole; and
    an adhesive coupled to and extending over said exposed outer face of said strip of material, wherein said outer face is configured for catching and holding flies contacting said adhesive.

2. The device of claim 1, further comprising said strip of material having a first section and a second section, each of said first section and said second section being arcuate.

3. The device of claim 2, further comprising each of said first section and said second section having co-linear opposite ends.

4. The device of claim 1, wherein said mask comprises a horse mask.

5. The device of claim 1, further comprising a cover coupled to said outer face of said strip of material, said cover being selectively removable to expose said adhesive.

6. The device of claim 1, further comprising said adhesive comprising a fragrance wherein said adhesive is configured to attract insects.

7. The device of claim 1, further comprising said adhesive comprising a sweetener wherein said adhesive is configured to attract insects.

8. The device of claim 1, further comprising said adhesive incorporating an insecticide wherein said adhesive is configured for killing insects becoming affixed to said adhesive.

9. A fly catching animal mask device comprising:
    a mask having at least one eye hole configured to fit on a head of an animal such that said eye hole is positioned around an eye of the animal, wherein said mask comprises a horse mask;
    a strip of material coupled to said mask, said strip of material having an exposed outer face, said strip of material extending around said eye hole, said strip of material having a first section and a second section, each of said first section and said second section being arcuate, each of said first section and said second section having co-linear opposite ends;
    an adhesive coupled to and extending over said exposed outer face of said strip of material, wherein said outer face is configured for catching and holding flies contacting said adhesive, said adhesive comprising a fragrance wherein said adhesive is configured to attract insects, said adhesive comprising a sweetener, wherein said adhesive is configured to attract insects; and
    a cover coupled to said outer face of said strip of material, said cover having a first portion complementary to and coupled to said first section of said strip of adhesive and a second portion complimentary and coupled to said second section of said strip of material, said first portion of said cover and said second portion of said cover each being selectively removable to expose said adhesive.

10. The device of claim 9, further comprising said adhesive incorporating an insecticide wherein said adhesive is configured for killing insects becoming affixed to said adhesive.

* * * * *